(12) United States Patent
Morikawa et al.

(10) Patent No.: US 7,924,297 B2
(45) Date of Patent: Apr. 12, 2011

(54) DISPLAY CONTROL APPARATUS AND DISPLAY CONTROL METHOD

(75) Inventors: Kenichi Morikawa, Kawasaki (JP); Tetsu Fukuda, Kawasaki (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 11/855,764

(22) Filed: Sep. 14, 2007

(65) Prior Publication Data

US 2008/0074444 A1 Mar. 27, 2008

(30) Foreign Application Priority Data

Sep. 26, 2006 (JP) ................................. 2006-260724

(51) Int. Cl.
*G09G 5/12* (2006.01)

(52) U.S. Cl. .................. 345/660; 345/670; 345/671

(58) Field of Classification Search .................. 345/660, 345/670, 671
See application file for complete search history.

(56) References Cited

U.S. PATENT DOCUMENTS

| | | | | |
|---|---|---|---|---|
| 6,002,386 A | * | 12/1999 | Gu | 345/690 |
| 6,389,153 B1 | * | 5/2002 | Imai et al. | 382/106 |
| 7,345,684 B2 | * | 3/2008 | Gardos | 345/204 |
| 7,583,253 B2 | * | 9/2009 | Jeng et al. | 345/156 |
| 2007/0055104 A1 | * | 3/2007 | Kumei et al. | 600/176 |
| 2007/0097265 A1 | * | 5/2007 | Yoshikawa et al. | 348/565 |
| 2007/0159470 A1 | * | 7/2007 | Jeng et al. | 345/204 |
| 2008/0074444 A1 | * | 3/2008 | Morikawa et al. | 345/660 |
| 2008/0143877 A1 | * | 6/2008 | Urabe et al. | 348/556 |
| 2009/0174658 A1 | * | 7/2009 | Blatchley et al. | 345/158 |
| 2009/0189914 A1 | * | 7/2009 | Yoshikawa et al. | 345/629 |

FOREIGN PATENT DOCUMENTS

| | | |
|---|---|---|
| JP | 2002-189463 A | 7/2002 |
| JP | 2003-058101 A | 2/2003 |
| JP | 2003153213 A * | 5/2003 |

* cited by examiner

*Primary Examiner* — Javid A Amini

(74) *Attorney, Agent, or Firm* — Canon U.S.A., Inc. I.P. Division

(57) ABSTRACT

An image control apparatus includes a signal-receiving unit to which image signals are input, a resolution detecting unit configured to detect the resolution of the input image signals, a viewing-distance detecting unit configured to detect a viewing distance between a viewer and a display apparatus, a display-size control unit configured to control a display size of images displayed in the display apparatus, a scaling unit, and an output unit configured to output the images scaled by the scaling unit to the display apparatus. When the resolution of images is changed, the scaling unit scales the image signals in accordance with the amount of change in resolution and the viewing distance, and outputs the signals to the display apparatus.

6 Claims, 13 Drawing Sheets

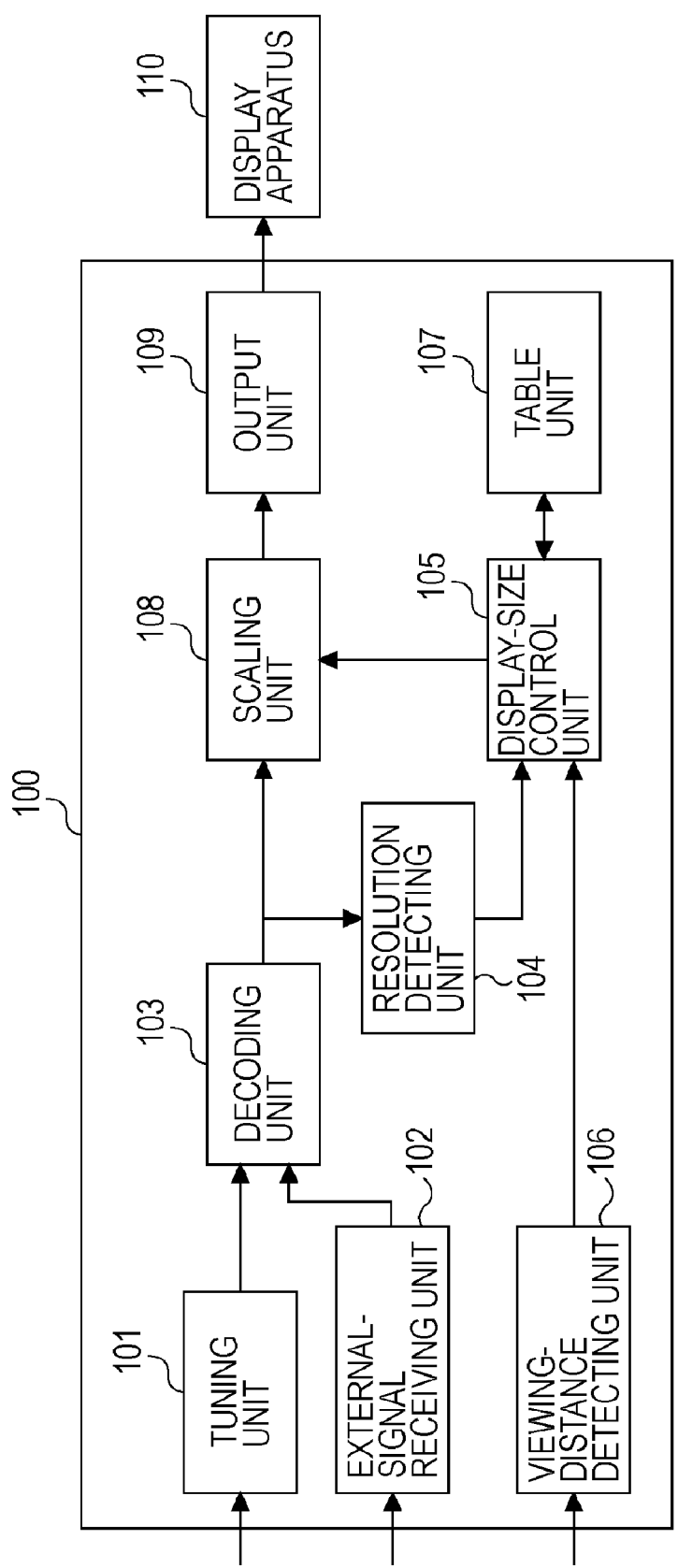

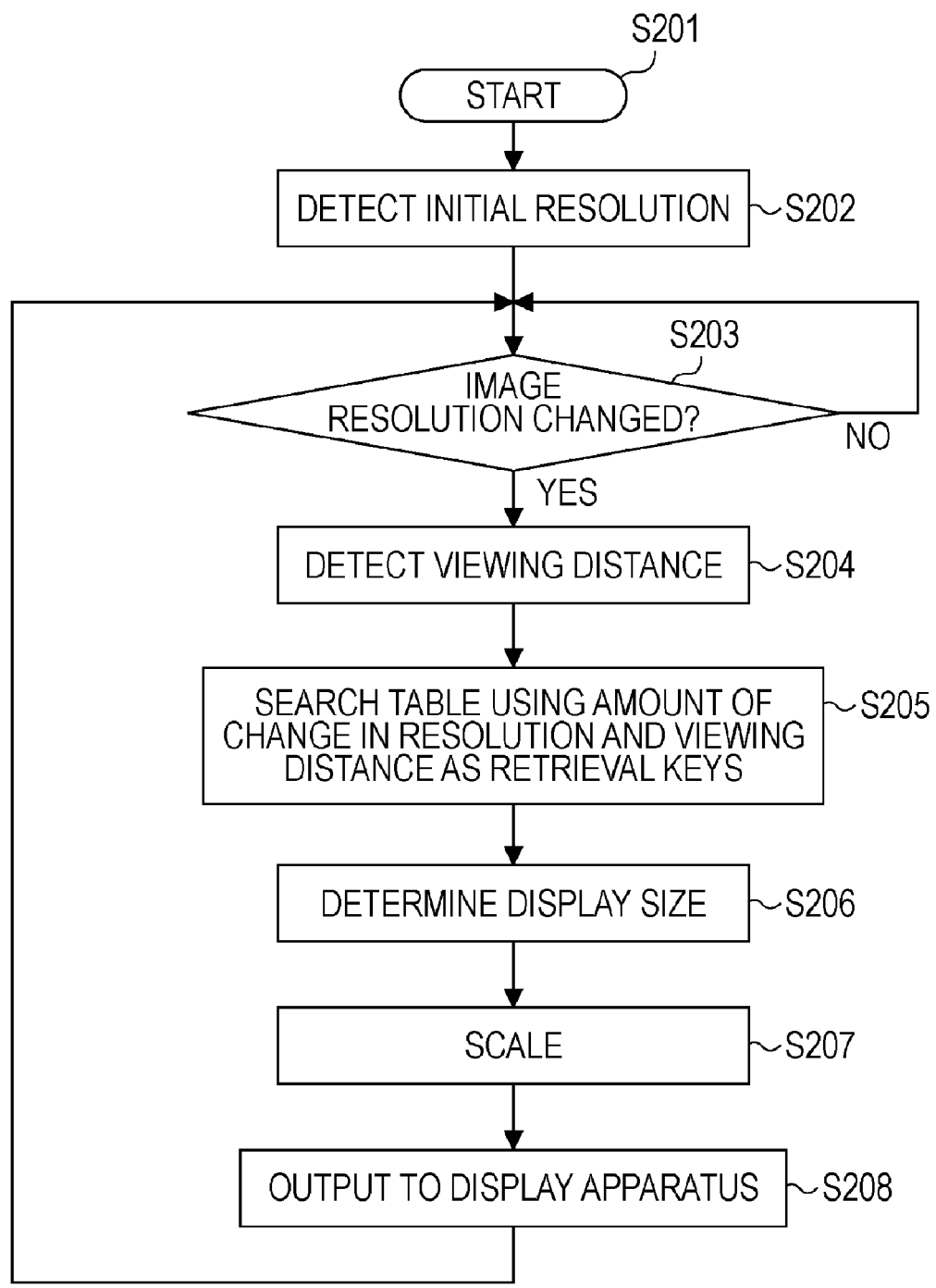

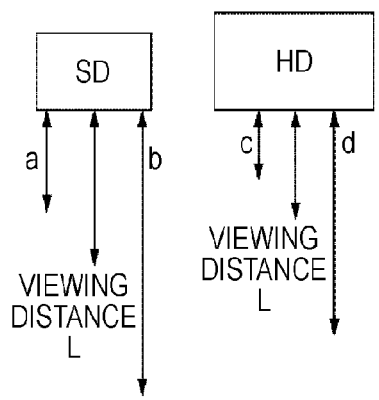

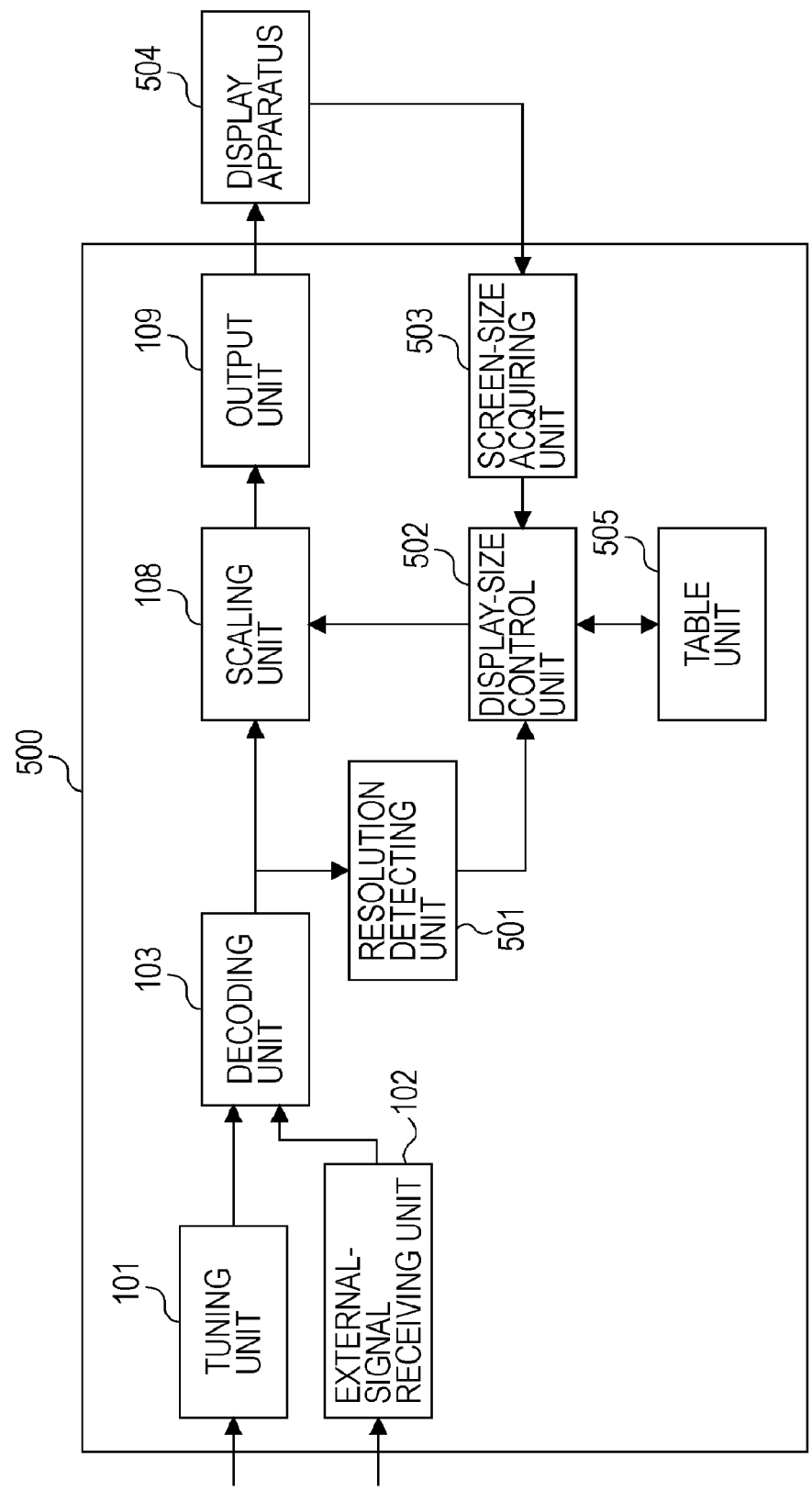

| OverHD TO SD | | HD TO SD | | OverHD TO HD | |
|---|---|---|---|---|---|
| t < 10 SEC. | 100% | t < 10 SEC. | 100% | t < 10 SEC. | 100% |
| 10 SEC. ≤ t < 1 MIN. | 80% | 10 SEC. ≤ t < 1 MIN. | 90% | 10 SEC. ≤ t < 1 MIN. | 90% |
| 1 MIN. ≤ t ≤ 1 HR. | 60% | 1 MIN. ≤ t ≤ 1 HR. | 70% | 1 MIN. ≤ t ≤ 1 HR. | 80% |
| t > 1 HR. | 50% | t > 1 HR. | 60% | t > 1 HR. | 70% | a ≤ L ≤ b

ADJUSTMENT MENU

■ SETTING FOR SHORT VIEWING DISTANCE
THRESHOLD  3 m
RATIO           80%

■ SETTING FOR MIDDLE VIEWING DISTANCE
FIXED            90%
VARIABLE

■ SETTING FOR LONG VIEWING DISTANCE
THRESHOLD  10 m
RATIO           100%

DISPLAY CONTROL APPARATUS AND DISPLAY CONTROL METHOD

BACKGROUND OF THE INVENTION

1. Field of the Invention

The present invention relates to display control apparatuses and display control methods for controlling display of image content, and more specifically, relates to display control apparatuses and display control methods for scaling display size of images in accordance with environments in which the image content is viewed.

2. Description of the Related Art

To date, image standards for digital broadcasting have been classified into a high-definition television (HD) type and a standard-definition television (SD) type. At present, research studies on Super Hi-Vision and the like are being conducted, and a high-definition and highly realistic image standard superior to HD (hereinafter referred to as OverHD) will take the place of HD in the future. With this, display apparatuses will have higher resolutions, and the screen size thereof will also be increased. On the other hand, it is anticipated that HD content and SD content will still be in existence together with OverHD content.

When low-resolution content is enlarged and displayed in a high-resolution display capable of displaying OverHD, the images are unacceptably blurred, and the image quality is significantly degraded. When OverHD content being viewed is switched to SD content, viewers perceive a particularly significant degradation in image quality. Discomfort or uneasiness experienced by viewers due to such a difference in resolution depends on viewing environment. For example, when high-resolution content being viewed is switched to low-resolution content under the following conditions, discomfort caused by a difference in resolution is further increased.

1. When the viewing distance is short.
2. When the screen is large.
3. When the viewing duration is long.

Japanese Patent Laid-Open No. 2003-058101 describes an image display apparatus capable of changing the display size in accordance with the viewing distance.

However, the display size is uniquely determined with respect to the resolution of detected image signals in the image display apparatus described in Japanese Patent Laid-Open No. 2003-058101. Therefore, the display size cannot be adaptively controlled in accordance with the degree of a reduction in resolution. As a result, discomfort experienced by viewers due to a difference in resolution cannot be sufficiently eased. Moreover, low-resolution images are always displayed on a reduced scale, and the benefit of large-screen displays cannot be sufficiently enjoyed.

SUMMARY OF THE INVENTION

The present invention is directed to an image control apparatus and an image control method capable of optimally scaling a display size of image content in an adaptive manner depending on the situation in which a viewer is viewing the image content, thus reducing discomfort experienced by the viewer when the resolution of images is reduced.

According to an aspect of the present invention, an image control apparatus, converting a resolution of input image signals and outputting the image signals to a display apparatus, includes a resolution detecting unit configured to detect the resolution of the input image signals; a viewing-distance detecting unit configured to detect a viewing distance between a viewer and the display apparatus, a screen-size acquiring unit configured to acquire a screen size of the display apparatus, and/or a timer unit configured to measure a viewing duration; a display-size control unit configured to control a display size of images displayed in the display apparatus; a scaling unit configured to convert the resolution of the image signals; and an output unit configured to output the images scaled by the scaling unit to the display apparatus. When the resolution of the input image signals is changed, the display-size control unit controls the display size of images displayed using the image signals after the resolution change based on an amount of change in resolution and the viewing distance, the screen size, and/or the viewing duration.

Further features of the present invention will become apparent from the following description of exemplary embodiments with reference to the attached drawings.

BRIEF DESCRIPTION OF THE DRAWINGS

FIG. 1 is a block diagram illustrating an image control apparatus according to a first exemplary embodiment of the present invention.

FIG. 2 is a flow chart illustrating a process conducted by the image control apparatus according to the first exemplary embodiment of the present invention.

FIG. 3 illustrates the relationship between the resolution of image content and a viewing distance according to the first exemplary embodiment of the present invention.

FIG. 4 illustrates the relationship between the resolution of image content and the viewing distance according to the first exemplary embodiment of the present invention.

FIG. 5 is a block diagram illustrating an image control apparatus according to a second exemplary embodiment of the present invention.

DESCRIPTION OF THE EMBODIMENTS

Figure 6:
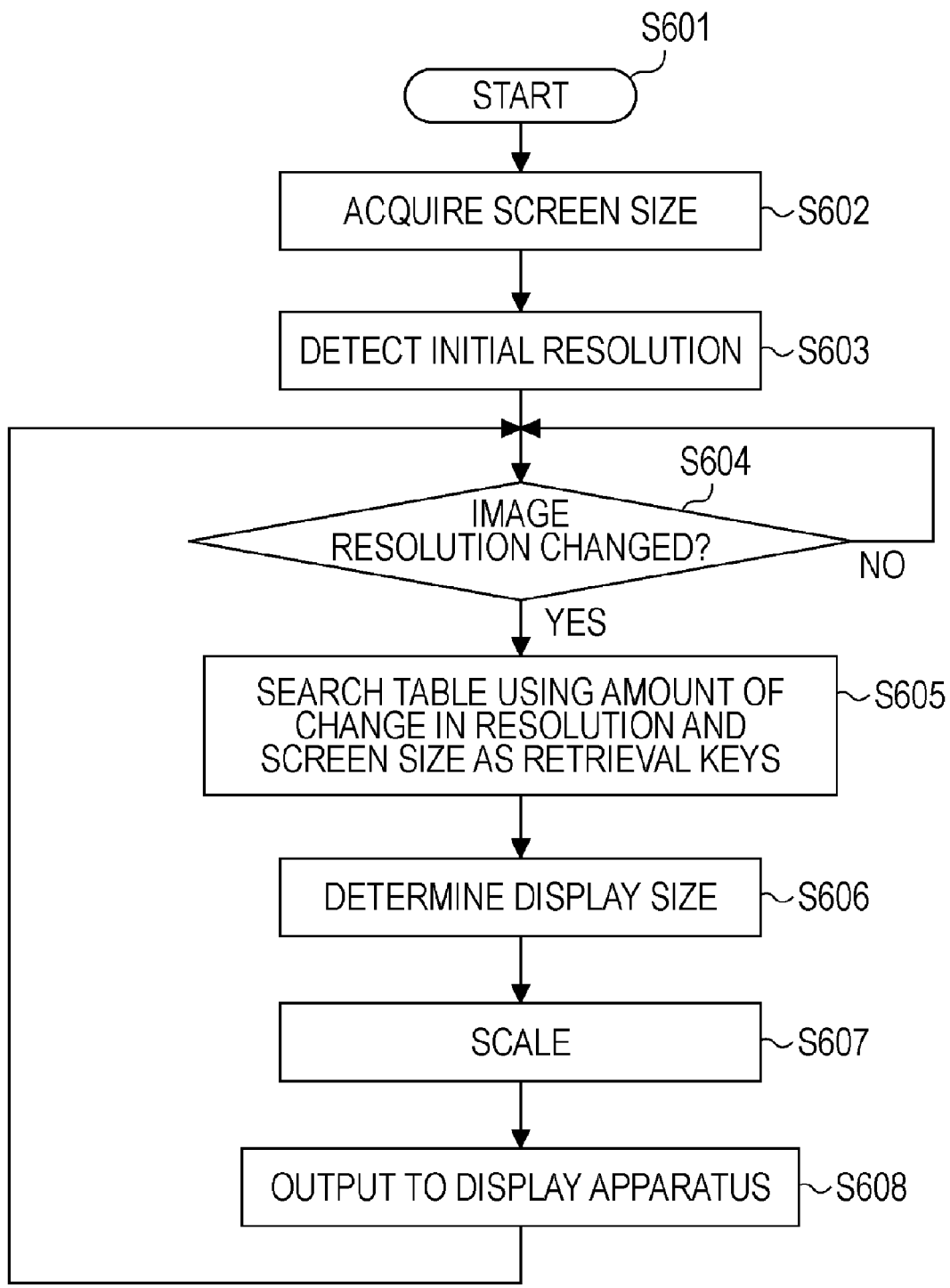
FIG. 6 is a flow chart illustrating a process conducted by the image control apparatus according to the second exemplary embodiment of the present invention.

Exemplary embodiments of the present invention will now be described with reference to the drawings.

First Exemplary Embodiment

FIG. 1 is a block diagram of a display control apparatus 100 that determines display size in accordance with an amount of change in resolution and a viewing distance according to a first exemplary embodiment of the present invention. A tuning unit 101 receives broadcast waves, and outputs image signals to the downstream unit. An external-signal receiving unit 102 is an interface for image signals output from a videotape recorder, a set-top box, or the like. Image signals output from the tuning unit 101 and the external-signal receiving unit 102 are encoded. A decoding unit 103 decodes the encoded image signals. In addition, the decoding unit 103 demultiplexes signals so that audio signals and image signals are separated from multiplexed signals. A resolution detecting unit 104 detects the resolution of the input image signals. When analog image signals are input, the resolution is determined by analyzing synchronization signals. When digital image signals are input, the resolution is determined by analyzing a sequence header of MPEG-2 Video. Alternatively, the resolution can be determined by referring to video_encode_format in a video-decode control descriptor described in Program Map Table (PMT). The resolution detecting unit 104 stores the results of resolution detection, and notifies a display-size control unit 105 of the amount of change in resolution when the resolution is changed. A viewing-distance detecting unit 106 measures a viewing distance, which is a distance between a display apparatus 110 and a viewer, and notifies the display-size control unit 105 of the measurement result. The measurement of the viewing distance can be realized using a ranging function of the display apparatus 110 and a remote controller equipped with ultra-wideband (UWB) communication devices. Alternatively, the distance to a viewer can be measured using infrared rays or ultrasonic waves radiated from the display apparatus 110. It is possible that the viewing distance is previously set by a viewer without the measurement. The remote controller is a user interface used for channel selection and various settings of the display apparatus 110. The display-size control unit 105 searches a table unit 107 using the amount of change in resolution and the viewing distance as retrieval keys, and determines the resolution to be used. The table unit 107 prestores conversion parameters to be set in a scaling unit 108. The scaling unit 108 scales the input image signals in accordance with the conversion parameter set by the display-size control unit 105. An output unit 109 converts the scaled image signals into signals in conformity with the interface of the display apparatus 110, and outputs the signals to the display apparatus 110. The above-described units are controlled by a controller (not shown).

FIG. 2 illustrates a control flow according to this exemplary embodiment. The display control apparatus 100 is started in Step S201. First, the resolution of the first input image signals is detected by the resolution detecting unit 104 in Step S202. The resolution detection is repeated until the resolution of the image signals is changed. When the resolution of the image signals is changed (Yes in Step S203), the viewing distance is detected in Step S204. Next, the table unit 107 is searched using the amount of change in resolution and the viewing distance as retrieval keys in Step S205, and the display size is determined in Step S206. The scaling unit 108 scales the input image signals in accordance with the determined display size in Step S207, and the output unit 109 outputs the signals to the display apparatus 110 in Step S208. Subsequently, the process returns to Step S203, and it is monitored whether or not the resolution of the input image signals is changed.

Next, how the display size is controlled in accordance with the amount of change in resolution and the viewing distance will be described in detail. Herein, 4,000×2,000, 1,920×1,080, and 720×483 resolutions are defined as OverHD, HD, and SD, respectively. "Resolution" can indicate pixel density of the display apparatus, or can indicate display resolution of image signals, i.e., image content.

FIG. 3 illustrates the resolutions of image content after a resolution change and threshold values of a viewing distance L. When the resolution is changed to SD, the smaller threshold value of the viewing distance L between the display apparatus and a viewer is defined as a, and the larger threshold value of the viewing distance L is defined as b. Moreover, when the resolution is changed to HD, the smaller threshold value is defined as c, and the larger threshold value is defined as d. In general, the optimum viewing distance for a display apparatus with a resolution of HD is shorter than that for a display apparatus with a resolution of SD when the screen sizes are the same. The optimum viewing distance is a viewing distance at which a viewer can view images displayed in the display apparatus most comfortably. That is, when images are finely displayed, roughness of the images is less visible even when a viewer approaches the display apparatus. Therefore, the optimum viewing distance for a display apparatus with high resolution is smaller than that for a display apparatus with low resolution. Thus, the viewing distance can be defined as a>c>0, and b>d>0 in FIG. 3.

FIG. 4 illustrates an example of a table of display sizes determined in accordance with the amount of change in resolution when the resolution of the input image content is changed and a viewing distance L on the basis of the relationships between the resolutions and the threshold values set as above. For example, when the resolution is changed from OverHD to SD and the viewing distance L is larger than the threshold value b, a ratio of the display size to the screen size is set to 100% (full-screen display). In contrast, when the viewing distance L is smaller than the threshold value a, the ratio of the display size to the screen size is set to 50%. When the viewer is located at a viewing distance in the range of a to b, the display size is determined as being between 100% and 50% in a stepwise manner in accordance with the viewing distance.

Next, a case where the resolution of image content is changed from HD to SD will be described. When the viewing distance L is larger than the threshold value b, the ratio of the display size to the screen size is set to 100% (full-screen display). Moreover, when the viewing distance L is smaller than the threshold value a, the ratio of the display size to the screen size is set to 60%. Furthermore, when the viewer is located at a viewing distance in the range of a to b, the display size is determined as being between 100% and 60% in a stepwise manner in accordance with the viewing distance.

Next, a case where the resolution of image content is changed from OverHD to HD will be described. When the viewing distance L is larger than the threshold value d, the ratio of the display size to the screen size is set to 100% (full-screen display). Moreover, when the viewing distance L is smaller than the threshold value c, the ratio of the display size to the screen size is set to 65%. Furthermore, when the viewer is located at a viewing distance in the range of a to b, the display size is determined as being between 100% and 65% in a stepwise manner in accordance with the viewing distance.

That is, the display size after the resolution change is reduced as the amount of change in resolution is increased, and the display size after the resolution change is increased as the viewing distance is increased.

When the case where the resolution is changed from OverHD to SD is compared with the case where the resolution is changed from HD to SD, the amount of change in resolution in the case where the resolution is changed from OverHD to SD is larger than that in the case where the resolution is changed from HD to SD. Since discomfort experienced by viewers due to the difference in resolution is increased as the amount of change in resolution is increased, the display size is reduced as the amount of change in resolution is increased.

Second Exemplary Embodiment

FIG. 5 is an internal block diagram of a display control apparatus 500 that determines display size in accordance with an amount of change in resolution of image content and a screen size of a display apparatus according to a second exemplary embodiment of the present invention. Components having the same reference numbers as shown in FIG. 1 operate in the same manner as the components shown in FIG. 1. A resolution detecting unit 501 detects the resolution of image signals output from the decoding unit 103. The resolution detecting unit 501 stores the results of resolution detection, and notifies a display-size control unit 502 of the amount of change in resolution before and after the resolution change when the resolution is changed. A screen-size acquiring unit 503 stores the screen size of the display apparatus. The display control apparatus 500 is connected to a display apparatus 504 via an interface in conformity with, for example, the digital visual interface (DVI) standard or the high definition multimedia interface (HDMI) standard. The screen size of the display apparatus 504 can be acquired from the display apparatus 504 by automatically acquiring extended display identification data (EDID) via a display data channel (DDC). When the display control apparatus 500 is connected to the display apparatus 504 via an interface that does not allow automatic acquisition of EDID, a predetermined screen size is prestored in the screen-size acquiring unit 503. The display-size control unit 502 searches a table unit 505 using the amount of change in resolution of image content and the screen size as retrieval keys, and determines the resolution to be used. The table unit 505 prestores conversion parameters to be set in the scaling unit 108. The scaling unit 108 scales the input image signals in accordance with the conversion parameter set by the display-size control unit 502, and outputs the scaled image signals to the output unit 109.

FIG. 6 illustrates a control flow according to this exemplary embodiment. The display control apparatus 500 is started in Step S601. First, the screen size of the display apparatus is acquired in Step S602. Next, the resolution of the input image signals is detected by the resolution detecting unit 501 in Step S603. The resolution detection is repeated until the resolution of the image signals is changed. When the resolution of the image signals is changed (Yes in Step S604), the process proceeds to Step S605. The table unit 505 is searched using the amount of change in resolution and the screen size as retrieval keys in Step S605, and the display size is determined in Step S606. The scaling unit 108 scales the input image signals in accordance with the determined display size in Step S607, and the output unit 109 outputs the signals to the display apparatus 504 in Step S608. Subsequently, the process returns to Step S604, and it is monitored whether or not the resolution of the input image signals is changed.

Next, how the display size of image content is controlled in accordance with the amount of change in resolution and the screen size will be described in detail.

Figure 7:
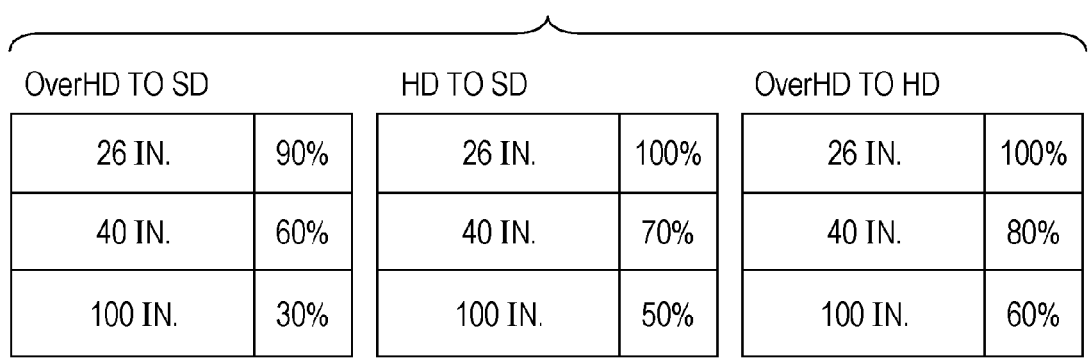
FIG. 7 illustrates the relationship between the resolution of image content and a screen size according to the second exemplary embodiment of the present invention.

FIG. 7 illustrates an example of a table of display sizes determined in accordance with the screen size and the amount of change in resolution when the resolution of the input image content is changed.

For example, when the resolution is changed from OverHD to SD and when the screen size is 26 inches, the ratio of the display size to the screen size is set to 90%. Similarly, when the screen size is 40 inches, the ratio of the display size to the screen size is set to 60%. Furthermore, when the screen size is 100 inches, the ratio of the display size to the screen size is set to 30%. In this manner, the ratio of the display size to the screen size is reduced as the screen size is increased.

Next, when the resolution is changed from HD to SD and when the screen size is 26 inches, the ratio of the display size to the screen size is set to 100% (full-screen display). When the screen size is 40 inches, the ratio of the display size to the screen size is set to 70%. When the screen size is 100 inches, the ratio of the display size to the screen size is set to 50%.

Next, when the resolution is changed from OverHD to HD and when the screen size is 26 inches, the ratio of the display size to the screen size is set to 100% (full-screen display). When the screen size is 40 inches, the ratio of the display size to the screen size is set to 80%. When the screen size is 100 inches, the ratio of the display size to the screen size is set to 60%.

That is, the display size after the resolution change is reduced as the amount of change in resolution is increased, and at the same time, the ratio of the display size to the screen size is reduced as the screen size is increased. The ratio of the display size to the screen size can also be selected such that the difference in resolution is obscured and, at the same time, such that the display size with respect to the screen size is not changed as much as possible. Alternatively, the ratio of the display size to the screen size can be controlled such that the display size with respect to the screen size is substantially constant even when the difference in resolution is slightly conspicuous.

Moreover, the display control apparatus 500 according to this exemplary embodiment can be applied to a front projector. A projector having a ranging sensor can measure the distance to a screen, and can calculate the size of a screen onto which light is projected. Controls similar to those according to this exemplary embodiment can be conducted by inputting the calculation results to the screen-size acquiring unit 503.

Third Exemplary Embodiment

Figure 8:
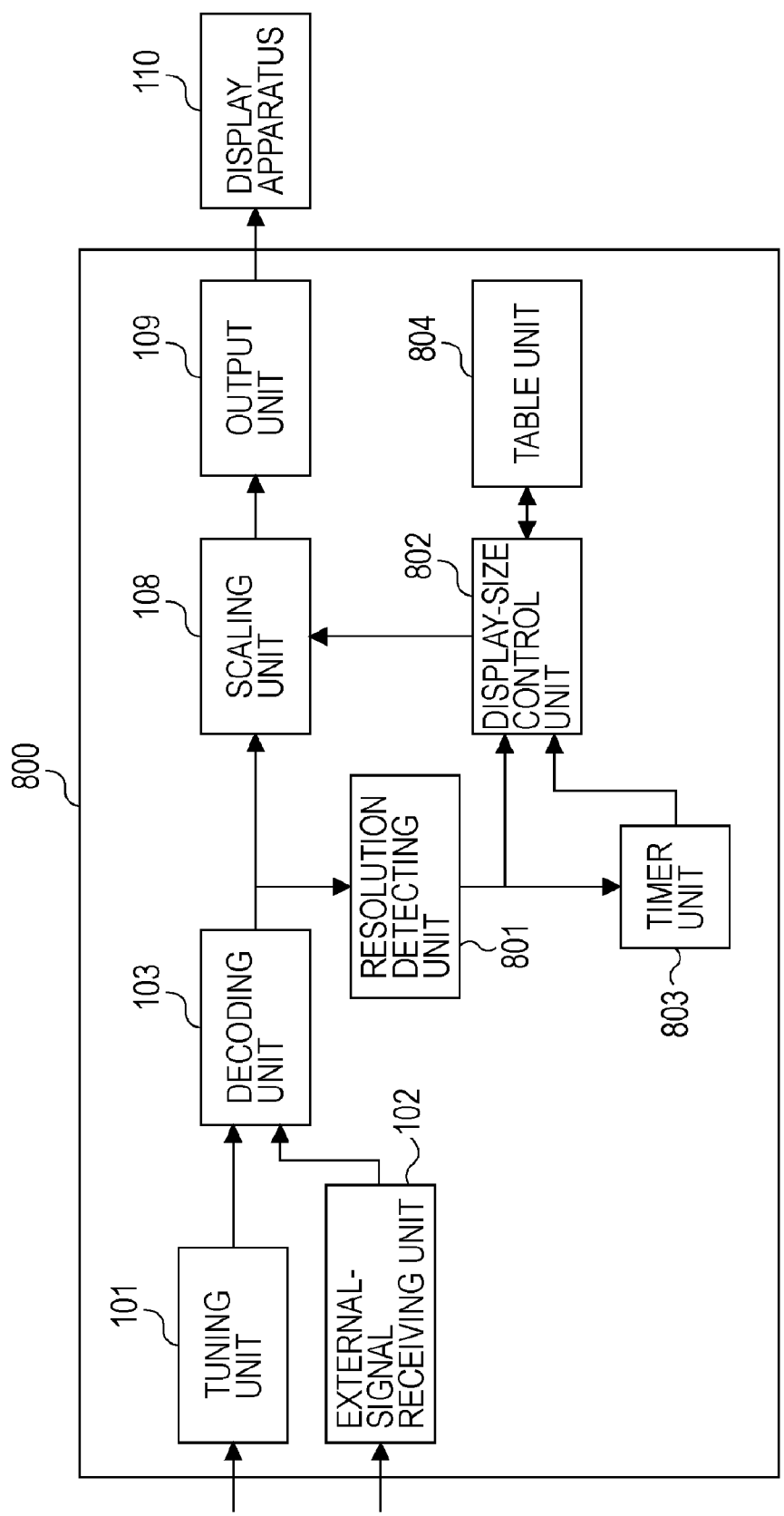
FIG. 8 is a block diagram illustrating an image control apparatus according to a third exemplary embodiment of the present invention.

FIG. 8 is an internal block diagram of a display control apparatus 800 that determines display size in accordance with an amount of change in resolution of image content and a viewing duration before a resolution change according to a third exemplary embodiment of the present invention. A resolution detecting unit 801 detects the resolution of image signals output from the decoding unit 103. The resolution detecting unit 801 stores the results of resolution detection, and notifies a display-size control unit 802 of the amount of change in resolution before and after the resolution change when the resolution is changed. Moreover, information indicating the resolution change is sent to a timer unit 803. When the timer unit 803 receives the information indicating the resolution change, the timer unit 803 sends the current value of the timer (viewing duration before the resolution change) to the display-size control unit 802. After the timer unit 803 sends the timer value, the timer unit 803 clears the value, and restarts the timer. The display-size control unit 802 searches a table unit 804 using the amount of change in resolution and the timer value as retrieval keys, and determines the resolution to be used. The table unit 804 prestores conversion parameters to be set in the scaling unit 108. The scaling unit 108 scales the input image signals in accordance with the conversion parameter set by the display-size control unit 802, and outputs the scaled image signals to the output unit 109.

Figure 9:
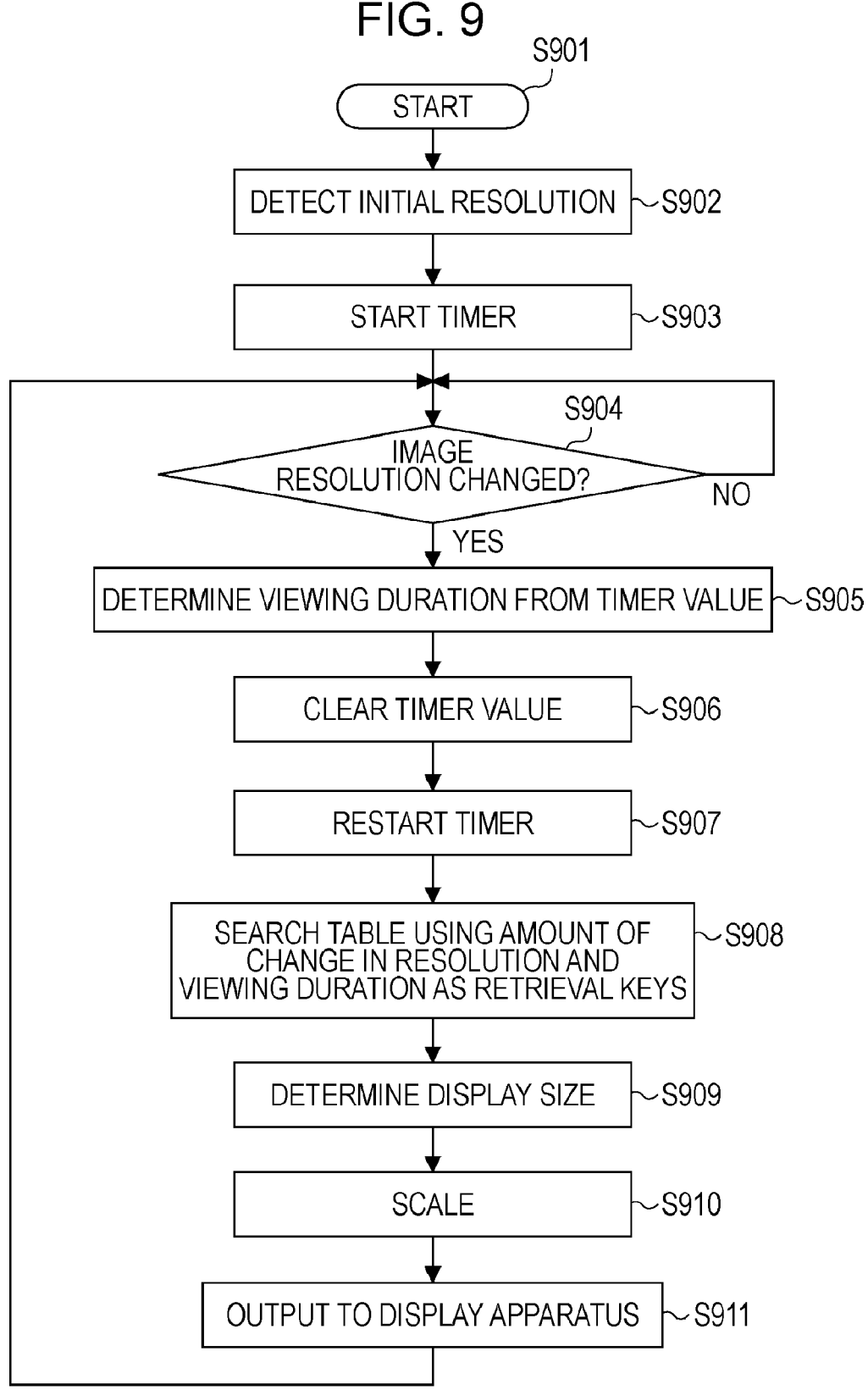
FIG. 9 is a flow chart illustrating a process conducted by the image control apparatus according to the third exemplary embodiment of the present invention.

FIG. 9 illustrates a control flow according to this exemplary embodiment. The display control apparatus 800 is started in Step S901. First, the resolution of the first input image signals is detected by the resolution detecting unit 801 in Step S902, and the timer is started in Step S903. The resolution detection is repeated until the resolution of the image signals is changed. When the resolution of the image signals is changed (Yes in Step S904), the viewing duration before the resolution change is determined from the timer value in Step S905. After the viewing duration before the resolution change is determined, the timer value is cleared in Step S906, and the timer is restarted in Step S907. The table unit 804 is searched using the amount of change in resolution and the viewing duration as retrieval keys in Step S908, and the display size is determined in Step S909. The scaling unit 108 scales the input image signals in accordance with the determined display size in Step S910, and the output unit 109 outputs the signals to the display apparatus 110 in Step S911. Subsequently, the process returns to Step S904, and it is monitored whether or not the resolution of the input image signals is changed.

Figures 10, 11:
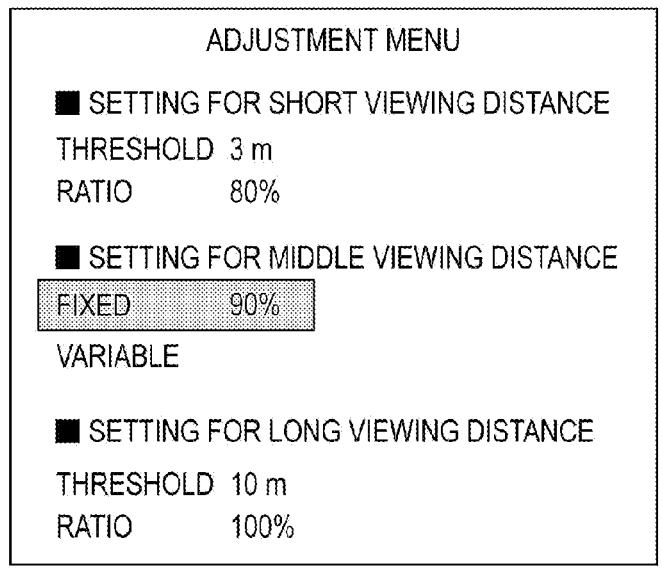
FIG. 10 illustrates the relationship between the resolution of image content and a viewing duration according to the third exemplary embodiment of the present invention.
FIG. 11 illustrates an exemplary adjustment menu according to a fourth exemplary embodiment of the present invention.

Next, how the display size is controlled in accordance with the amount of change in resolution and the viewing duration before the resolution change will be described in detail. FIG. 10 illustrates an example of a table of display sizes determined in accordance with the amount of change in resolution when the resolution of the input image content is changed and the viewing duration before the resolution change.

For example, when the resolution is changed from OverHD to SD and when the viewing duration before the resolution change is less than 10 seconds, the ratio of the display size to the screen size is set to 100% (full-screen display). When the viewing duration before the resolution change is from 10 seconds to less than 1 minute, the ratio of the display size to the screen size is set to 80%. When the viewing duration is from 1 minute to 1 hour, the ratio of the display size to the screen size is set to 60%. When the viewing duration is more than 1 hour, the ratio of the display size to the screen size is set to 50%. In this manner, the ratio of the display size to the screen size is reduced as the viewing duration before the resolution change is increased.

Next, when the resolution is changed from HD to SD and when the viewing duration before the resolution change is less than 10, the ratio of the display size to the screen size is set to 100% (full-screen display). When the viewing duration is from 10 seconds to less than 1 minute, the ratio of the display size to the screen size is set to 90%. When the viewing duration is from 1 minute to 1 hour, the ratio of the display size to the screen size is set to 70%. When the viewing duration is more than 1 hour, the ratio of the display size to the screen size is set to 60%.

Next, when the resolution is changed from OverHD to HD and when the viewing duration before the resolution change is less than 10 seconds, the ratio of the display size to the screen size is set to 100% (full-screen display) When the viewing duration is from 10 seconds to less than 1 minute, the ratio of the display size to the screen size is set to 90%. When the viewing duration is from 1 minute to 1 hour, the ratio of the display size to the screen size is set to 80%. When the viewing duration is more than 1 hour, the ratio of the display size to the screen size is set to 70%.

That is, the display size after the resolution change is reduced as the amount of change in resolution is increased, and at the same time, the ratio of the display size to the screen size is reduced as the viewing duration before the resolution change is increased.

Fourth Exemplary Embodiment

Figure 12:
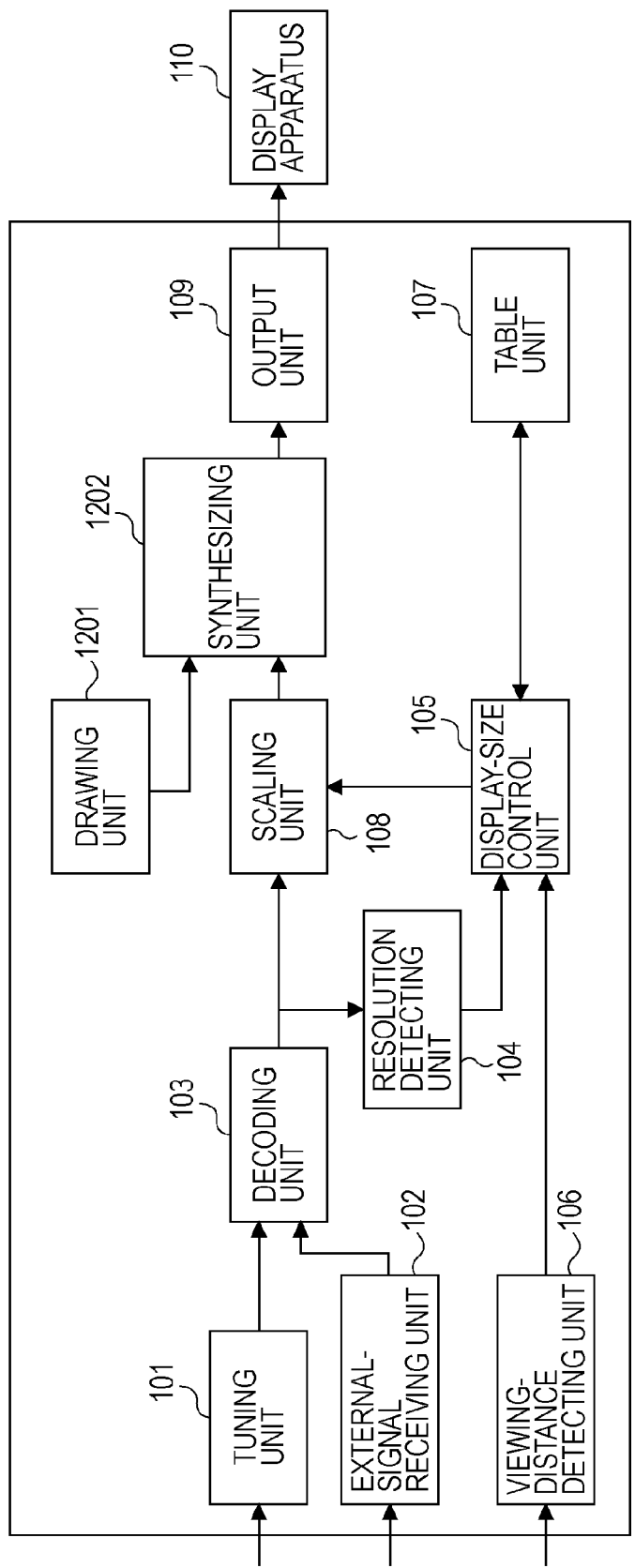
FIG. 12 is a block diagram illustrating an image control apparatus according to the fourth exemplary embodiment of the present invention.

In the above-described exemplary embodiments, a table for determining the display size is preset, and the display size is automatically controlled. However, the table for determining the display size can be manually set by a viewer. In a case where this exemplary embodiment is applied to the first exemplary embodiment, an adjustment menu as shown in FIG. 11 can be displayed on the screen of the display apparatus such that the viewer can set various parameters for a short viewing distance, a middle viewing distance, and a long viewing distance using the remote controller. In FIG. 11, the threshold values of the viewing distance and the ratios of the display size to the screen size for the short and long viewing distances can be set. For the middle viewing distance, the viewer can select whether the ratio of the display size to the screen size is fixed or variable. When the ratio of the display size to the screen size is fixed, the ratio of the display size to the screen size for the middle viewing distance can be manually set. When the ratio of the display size to the screen size is variable, the ratio of the display size to the screen size is automatically determined in accordance with the current viewing distance in a stepwise manner from the threshold values and the ratios of the display size to the screen size set for the short and long viewing distances. These setting values are written in the table for determining the display size shown in FIG. 4. Similarly, parameters can be manually set in the second and third exemplary embodiments in a similar manner. FIG. 12 is a block diagram for conducting a process according to this exemplary embodiment. In addition to the units shown in FIG. 1, the diagram shown in FIG. 12 includes a drawing unit 1201 that creates an adjustment menu and a synthesizing unit 1202 that synthesizes the drawn images and the input images before outputting the images to the output unit 109.

Moreover, the table for determining the display size can be successively updated by learning the display sizes that are manually changed by the viewer. The learning history is processed and retained by the controller. An example of this learning function applied to the first exemplary embodiment will now be described. The initial values in the table for determining the display size are set as shown in FIG. 4. For example, when the resolution is changed from OverHD to SD, a viewer located at a viewing distance b or farther reduces the display size to 90% using a remote controller. In this case, the value in the corresponding cell in the table for determining the display size shown in FIG. 4 is changed from 100% to 90%, and the display size is set to 90% the next time the same situation arises.

Fifth Exemplary Embodiment

Figure 13:
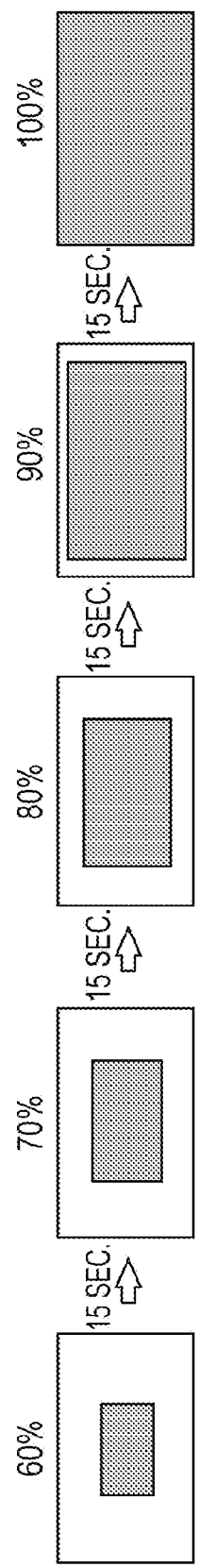
FIG. 13 illustrates changes in the display size according to a fifth exemplary embodiment of the present invention.

In this exemplary embodiment, the display size is increased in a stepwise manner after the initial display size is determined using methods described in, for example, the first to third exemplary embodiments, and is finally increased to the full-screen size. FIG. 13 illustrates changes in the display size when a duration of displaying in a display size and an increment in the ratio of the display size to the screen size are constant. Herein, images are displayed in a display size of 60% with respect to the full screen after the resolution of the image content is changed. Subsequently, the ratio of the display size to the full screen is increased to 100% in 10% increments every 15 seconds.

Figure 14:
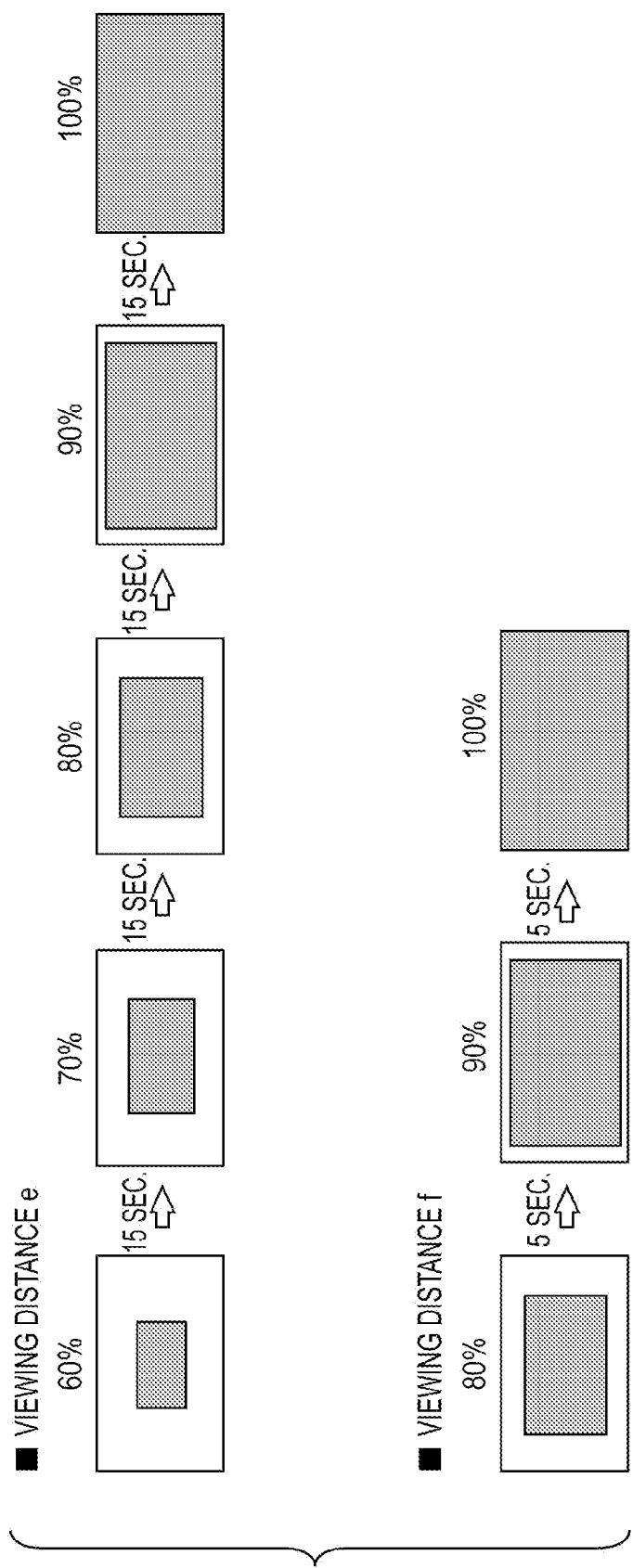
FIG. 14 illustrates changes in the display size according to the fifth exemplary embodiment of the present invention.
Figure 15:
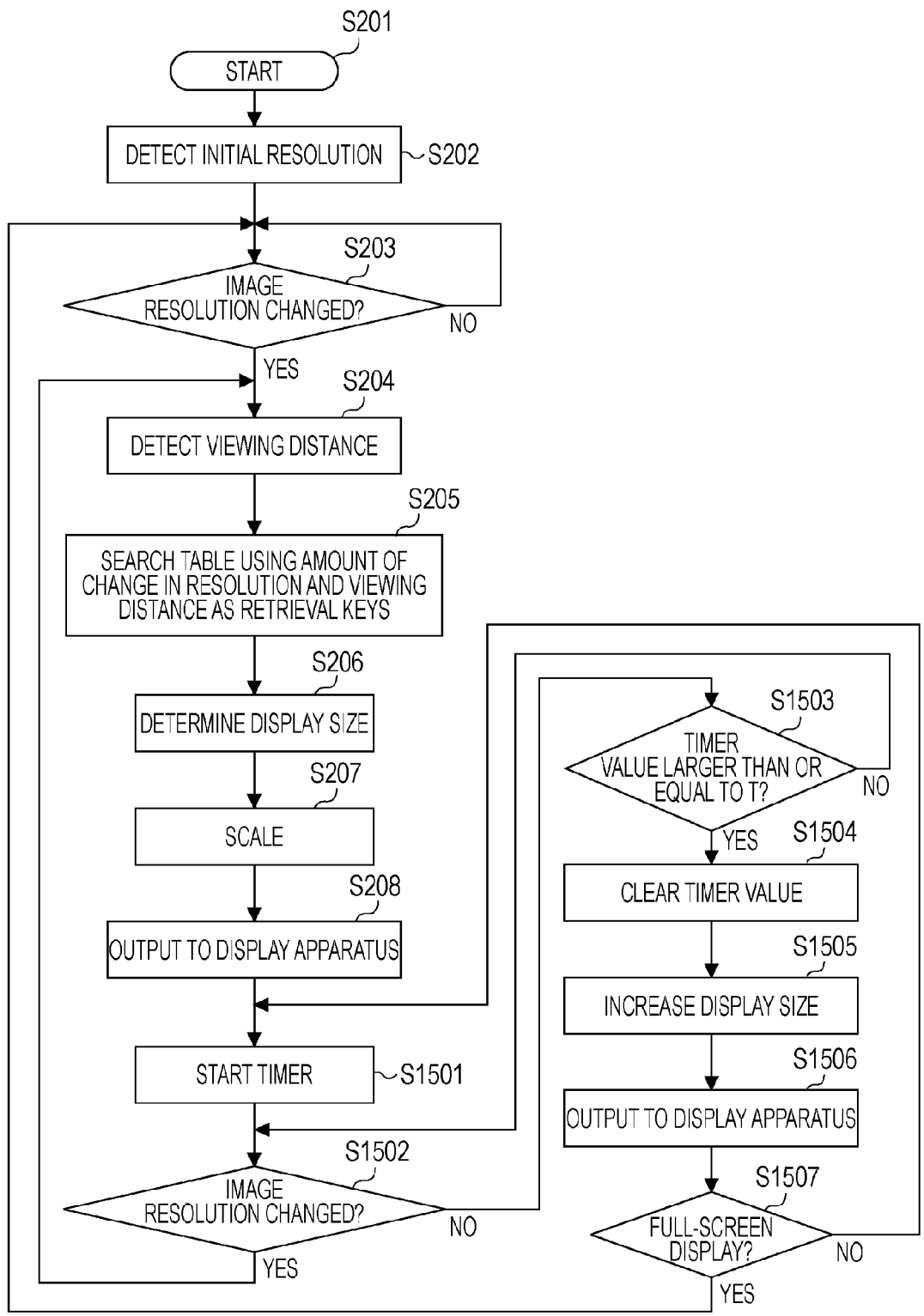
FIG. 15 is a flow chart illustrating a process conducted by the image control apparatus according to the fifth exemplary embodiment of the present invention.

Moreover, the speed of expansion can be controlled on the basis of the viewing distance, the screen size, or the viewing duration. In a case where this exemplary embodiment is applied to the first exemplary embodiment, the display size can be gradually expanded when the viewing distance is short, and can be expanded in a short time when the viewing distance is long. For example, as shown in FIG. 14, the duration of displaying in a display size is set to 15 seconds for a viewing distance e, and the time of displaying in a display size is set to 5 seconds for a viewing distance f (herein, 0<e<f). The viewing distance and the duration of displaying in a display size can be stored in a table. FIG. 15 illustrates a process flow according to this exemplary embodiment. Steps up to Step S208 are the same as those in the flow according to the first exemplary embodiment. A timer for measuring time is started in Step S1501. This timer function can be integrated into the display-size control unit 105. Next, it is determined whether or not the resolution of image content is changed in Step S1502. When it is determined that the resolution of image content has changed (Yes in Step S1502), the process returns to Step S204. When it is determined that the resolution of image content has not changed (No in Step S1502), the process proceeds to Step S1503. In Step S1503, the timer value is compared with a set time T. When the timer value is larger than or equal to T (Yes in step S1503), it is determined that the set time T has elapsed, and the timer value is cleared in Step S1504. When the set time T has not elapsed (No in step S1503), the process returns to Step S1502. After the timer value is cleared in Step S1504, the display size is increased in Step S1505, and the expanded images are output to the display apparatus 110 in Step S1506. Subsequently, it is determined whether or not the display size corresponds to the full-screen size in Step S1507. When it is determined that the display size does not correspond to the full-screen size (No in Step S1507), the process returns to Step S1501, and the timer is started. When it is determined that the display size corresponds to the full-screen size (Yes in Step S1507), the process proceeds to Step S203, and it is monitored whether or not the resolution is changed again.

In a case where this exemplary embodiment is applied to the second exemplary embodiment, the display size can be gradually expanded when the screen size is large, and can be expanded in a short time when the screen size is small.

In a case where this exemplary embodiment is applied to the third exemplary embodiment, the display size can be gradually expanded when the viewing duration before the resolution change is long, and can be expanded in a short time when the viewing duration is short.

In this manner, the display size can be returned to the full-screen size while discomfort caused by a difference in resolution is reduced.

In the above-described exemplary embodiments, only three types of resolution, i.e., OverHD, HD, and SD, are described for ease of explanation. However, the same operation can be realized for four or more resolutions by adding a table for determining the resolution.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2006-260724 filed Sep. 26, 2006, which is hereby incorporated by reference herein in its entirety.

What is claimed is:

1. An image control apparatus, converting a resolution of input image signals and outputting the image signals to a display apparatus, comprising:
    a resolution detecting unit configured to detect the resolution of the input image signals;
    a viewing-distance detecting unit configured to detect a viewing distance between a viewer and the display apparatus;
    a display-size control unit configured to control a display size of images displayed in the display apparatus; and
    a scaling unit configured to convert the resolution of the image signals,
    wherein, if the resolution of the input image signals is changed, the display-size control unit controls in such a manner that the larger an amount of change in the resolution is, the smaller the display size after the resolution change becomes, and in such a manner that the greater the viewing distance is, the larger the display size after the resolution change becomes.

2. An image control apparatus, converting a resolution of input image signals and outputting the image signals to a display apparatus, comprising:
    a resolution detecting unit configured to detect the resolution of the input image signals;
    a screen-size acquiring unit configured to acquire a screen size of the display apparatus;
    a display-size control unit configured to control a display size of images displayed in the display apparatus; and
    a scaling unit configured to convert the resolution of the image signals,
    wherein, if the resolution of the input image signals is changed, the display-size control unit controls in such a manner that the larger an amount of change in the resolution is, the smaller the display size after the resolution change becomes, and in such a manner that the greater the viewing distance is, the larger the display size after the resolution change becomes.

3. An image control apparatus, converting a resolution of input image signals and outputting the image signals to a display apparatus, comprising:
    a resolution detecting unit configured to detect the resolution of the input image signals;
    a timer unit configured to measure a viewing duration;
    a display-size control unit configured to control a display size of images displayed in the display apparatus; and
    a scaling unit configured to convert the resolution of the image signals,
    wherein, if the resolution of the input image signals is changed, the display-size control unit controls in such a manner that the larger an amount of change in the resolution is, the smaller the display size after the resolution change becomes, and in such a manner that the greater the viewing distance is, the larger the display size after the resolution change becomes.

4. An image control method, converting a resolution of input image signals and outputting the image signals to a display apparatus, comprising the steps of:
    detecting the resolution of the input image signals;
    acquiring a viewing distance between a viewer and the display apparatus; and
    controlling a display size of images displayed in the display apparatus, the controlling step controlling, if the resolution of the input image signals is changed, in such a manner that the larger an amount of change in the resolution is, the smaller the display size after the resolution change becomes, and in such a manner that the greater the viewing distance is, the larger the display size after the resolution change becomes.

5. An image control method, converting a resolution of input image signals and outputting the image signals to a display apparatus, comprising the steps of:
   detecting the resolution of the input image signals;
   acquiring a screen size of the display apparatus; and
   controlling a display size of images displayed in the display apparatus, the controlling step controlling,
   if the resolution of the input image signals is changed, in such a manner that the larger an amount of change in the resolution is, the smaller the display size after the resolution change becomes, and in such a manner that the greater the viewing distance is, the larger the display size after the resolution change becomes.

6. An image control method, converting a resolution of input image signals and outputting the image signals to a display apparatus, comprising the steps of:
   detecting the resolution of the input image signals;
   measuring a viewing duration, which is a time from when the image control method is started to when a change in the resolution of the input image signals is detected or a time from when a change in the resolution of the input signals is detected to when a next change in the resolution of the input image signals is detected; and
   controlling a display size of images displayed in the display apparatus, the controlling step controlling,
   if the resolution of the input image signals is changed, in such a manner that the larger an amount of change in the resolution is, the smaller the display size after the resolution change becomes, and in such a manner that the greater the viewing distance is, the larger the display size after the resolution change becomes.

* * * * *